US007923690B2

(12) United States Patent
Thielemans

(10) Patent No.: US 7,923,690 B2
(45) Date of Patent: Apr. 12, 2011

(54) METHOD OF AND SOFTWARE FOR CONDUCTING MOTION CORRECTION IN TOMOGRAPHIC SCANNING AND SYSTEM FOR TOMOGRAPHIC SCANNING USING THE METHOD

(75) Inventor: Kris Filip Johan Jules Thielemans, London (GB)

(73) Assignee: Hammersmith Imanet Limited, London (GB)

( * ) Notice: Subject to any disclaimer, the term of this patent is extended or adjusted under 35 U.S.C. 154(b) by 391 days.

(21) Appl. No.: 11/917,179

(22) PCT Filed: Jun. 9, 2006

(86) PCT No.: PCT/GB2006/002125
§ 371 (c)(1),
(2), (4) Date: Dec. 11, 2007

(87) PCT Pub. No.: WO2006/134332
PCT Pub. Date: Dec. 21, 2006

(65) Prior Publication Data
US 2009/0154641 A1    Jun. 18, 2009

(30) Foreign Application Priority Data
Jun. 16, 2005    (GB) .................................. 0512252.8

(51) Int. Cl.
*G01T 1/29* (2006.01)
(52) U.S. Cl. ................................................. 250/363.03
(58) Field of Classification Search .............. 250/363.03
See application file for complete search history.

(56) References Cited

U.S. PATENT DOCUMENTS
2002/0025017 A1 *  2/2002  Stergiopoulos et al. .......... 378/8
2004/0030246 A1    2/2004  Townsend et al.

FOREIGN PATENT DOCUMENTS
WO    2005/038491    4/2005

OTHER PUBLICATIONS

Thielemans et al., Object Dependency of Resolution in Reconstruction Algorithms With Interiteration Filtering Applied to PET Data, Apr. 2004,IEEE Transactions on Medical Imaging, vol. 23, No. 4, pp. 433-446.*
C.C. Watson,New,Faster,Image-Based Scatter Correction for 3D PET, August 200, IEE Transactions On Nuclear Science, vol. 47, No. 4, pp. 1587-1594.*
C.C. Watson,New,Faster, Image-Based Scatter Correction for 3D PET, Aug. 2000, IEE Transactions On Nuclear Science, vol. 47, No. 4, pp. 1587-1594.*

(Continued)

*Primary Examiner* — David P Porta
*Assistant Examiner* — Djura Malevic
(74) *Attorney, Agent, or Firm* — Robert F. Chisholm

(57) ABSTRACT

During data acquisition in a tomographic scan of a subject unscattered events and scatter events are collected. The data are corrected for the scatter events and movement of the subject during the scan. A scatter estimate is derived for use in the reconstruction of an image of the subject; a first step in the derivation has a first dependence on the movement of the subject. The image of the subject is derived from the detected events using the scatter estimate; a second step in this derivation has a second dependence on the movement of the subject, the dependence being different from that of the first step.

22 Claims, 5 Drawing Sheets

OTHER PUBLICATIONS

Fulton, R.R. et.al., "Compensation for head movement in 3D PET" 2001 IEEE Nuclear Science Symposium Conference Record Nov. 4-10, 2001, San Diego, CA vol. 4, Nov. 2001, pp. 2013-2017.

Watson, C.C., et.al., "A single scatter simulation technique for scatter correction in 3D PET" Proceedings of the International Meeting on Fully Three-Dimensional Image Reconstruction in Radiology and Nuclear Medicined, Jul. 4, 1995, pp. 215-219.

Thielemans, KI, et.al., "Image reconstruction of motion correction sinograms" 2003 IEEE Nuclear Science Symposium Conference and Medical Imaging Conference, Portland OR, Oct. 19-25, 2003, IEEE Nuclear Science Symposium Conf. Record, New York, NY, US, vol. 5 of 5 Oct. 19, 2003, pp. 2401-2406.

PCT/GB2006/002125 Int'l Search Report/Written Opinion dated Nov. 2006.

GB 0512252.8 Search Report dated Oct. 2005.

* cited by examiner

| t | D1 | D2 |
|---|----|----|
|   |    |    |

METHOD OF AND SOFTWARE FOR CONDUCTING MOTION CORRECTION IN TOMOGRAPHIC SCANNING AND SYSTEM FOR TOMOGRAPHIC SCANNING USING THE METHOD

This application is a filing under 35 U.S.C. 371 of international application number PCT/GB2006/002125, filed Jun. 9, 2006, which claims priority to application number 0512252.8 filed Jun. 16, 2005 in Great Britain the entire disclosure of which is hereby incorporated by reference.

FIELD OF THE INVENTION

The invention relates to a method of and software for conducting motion correction in tomographic scanning and a system for tomographic scanning using this method, in particular but not exclusively a positron emission tomography (PET) scanning system.

BACKGROUND OF THE INVENTION

A typical emission scan using a PET scanner starts with the injection of a solution including a tracer into the subject to be scanned. The subject may be human or animal. The tracer is a pharmaceutical compound including a radioisotope with a relatively short half-life. The tracer has been adapted such that it is attracted to sites within the subject where specific biological or biochemical processes occur. The tracer moves to and is typically taken up in one or more organs of the subject in which these biological and biochemical processes occur. When the radioisotope decays, it emits a positron, which travels a short distance before annihilating with an electron. The short distance, also called the positron range, is of the order of 1 mm in common subjects. The annihilation produces two high energy photons propagating in substantially opposite directions. The PET scanner includes a photon detector array arranged around a scanning area, usually in a ring-shaped pattern, in which the subject or at least the part of interest of the subject is arranged. When the detector array detects two photons within a short timing window, a so-called 'coincidence' is recorded. The line connecting the two detectors that received the photons is called the line of response (LOR). The reconstruction of the image is based on the premise that the decayed radioisotope is located somewhere on the LOR. It should be noted that in fact the annihilation occurs on the LOR and the decayed radioisotope is a positron range removed from the point of annihilation. The relatively short positron range may be neglected or can be compensated for in the reconstruction. Each coincidence may be recorded in a list by three entries: two entries representing the two detectors, one entry representing the time of detection. The coincidences in the list can be grouped in one or more sinograms. A sinogram is typically processed using image reconstruction algorithms to obtain volumetric medical images of the subject.

The detector array of a typical PET scanner does not rotate during an acquisition and is generally arranged in two or more banks of stationary detector rings. Alternatively, the detectors may be arranged in a non-ring-shaped pattern. In most detector configurations there will be directions in which coincidences are not detectable due to the geometry of the detector array, since the scanner has a finite field of view and there may be blind spots due to gaps between the detectors.

To obtain quantitative results from a PET scan, the processing must, among others, take into account the attenuation of the photons within the subject. An estimate of the attenuation may be obtained by making test scans in which one or more positron emitter rod sources are arranged in the scanner. The sources may be made of a material such as $^{68}$Ge, which emits dual annihilation photons. Conventionally, two scans are used to derive the attenuation estimate, a blank scan in which the subject being scanned is not present in the scanning area and, typically, the scanner is empty except for the presence of the sources, and a transmission scan in which both the subject and the sources are present in the scanning area. The results of the blank scan are then divided by the results of the transmission scan, providing an attenuation sinogram. The attenuation sinogram can be used to correct the emission scan of the subject for the effects of attenuation.

Another image degrading factor is the scattering of annihilation photons within the subject. Compton scattering is the dominant mechanism of interaction in the human tissue. The ratio of scattered photons to the total number of photons detected may be up to 50%. The two photons of an annihilation do not in general travel anymore in opposite directions after scattering. Hence, the decayed radioisotope will in general not be located on the LOR of a scatter event. Scatter events therefore degrade the image and the detection data are preferably corrected for scatter. A coincidence without scattering resulting from a single annihilation, where the radioisotope lies on the LOR, is called an unscattered event.

A method for scatter correction is known from the article 'Model-based scatter correction for fully 3D PET' by J. M. Ollinger in Phys. Med. Biol. 41(1996) pages 153-176. The method is iterative and starts with an estimate of the distribution of the radioactivity, i.e. an estimate of the image, and an estimate of the attenuation of the subject, from which an estimate of the scatter is calculated. The detection data are scatter corrected using the calculated scatter estimate. The scatter corrected data is used to reconstruct a better estimate of the image. This image is used in a following iteration to calculate a better scatter estimate. The method may also be based on sinograms instead of images.

With the improving quality of PET scanners, subject movement during a scan becomes an important degrading factor for the resolution of the reconstructed images. For example with brain scans, head movement causes a time varying rigid body transformation of the brain, and hence of the radioactivity distribution to be imaged. The head movement can be monitored, and the effects of the monitored movements on the detection data can be corrected.

A known method for motion correction is the so-called multiple acquisition frame (MAF) method, as disclosed in for example the paper 'Motion correction of PET images using multiple acquisition frames' by Y. Picard and C. J. Thompson in IEEE TMI vol. 16(1997) page 137. In this method the total data acquisition period is split into short time frames, the duration of which may be determined by the amount of motion of the subject. The sinogram of each short time frame is processed to provide an image of the subject. Each image is repositioned to a reference position using movement data of the subject. At the end of the scan the repositioned images are combined into one final image.

High-resolution scanning of a subject makes combined motion correction and scatter correction desirable. When the above described methods for motion correction and scatter correction are combined in one method for processing detection data, the method does not provide the expected quantitative results for high-resolution imaging.

It is an object of the invention to provide a method for combined motion correction and scatter correction, computer software and a scanner system for carrying out the method.

SUMMARY OF THE INVENTION

The object of the invention is achieved in a method of conducting motion correction for a tomographic scanner including a detector array for detecting radiation from a subject to generate detection data, wherein the method comprises collecting the detection data during a data acquisition period and determining movement data representing a time-dependent position of the subject during the data acquisition period, wherein the method comprises a first step of deriving a scatter estimate for use in the reconstruction of an image of the subject, the first step having a first dependence on the movement of the subject, and a second step of deriving the image of the subject from the detection data, the second step having a different, second dependence on the movement of the subject. The invention is based on the recognition that unscattered events and scatter events must be treated differently in a method of processing detection data and applying motion correction, because unscattered events and scatter events behave differently under motion. Therefore, the first step of deriving a scatter estimate depends in a different way on the movement of the subject than the second step of deriving the image. The scatter estimate may be determined in several ways, for example using a physical model of the scattering process, a physical model combined with detection data or mainly using the detection data. The first step may be performed before the second step, but part of the second step may also be performed before the first step and another part of the second step after the first step. The step of deriving the estimate or the image may form only one of a series of steps necessary for achieving the estimate or the image.

In a first embodiment of the method according to the invention the data acquisition period comprises long time frames and short time frames, the long time frames and short time frames having different durations determined by the movement, and the first step includes deriving a long time frame scatter estimate and the second step includes motion correction of the detection data collected in a short time frame. The movement of the subject being scanned requires that the detection data be acquired during a relatively short time frame, lest the movement affects the resolution of the image derived from the unscattered events. Since the distribution of scatter events is less sensitive to movement of the subject than the distribution of unscattered events, a scatter estimate may be derived for a long time frame. The duration of the long time frame is such that movement during the long time frame does not substantially influence a scatter estimate derived from the scatter events, possibly unscattered events collected in the long time frame and/or a physical model. An advantage of deriving a scatter estimate from a long time frame is that the signal-to-noise ratio of the data is higher than in a short time frame, where the noise level is relatively high for determining the scatter estimate in correcting detection data. Another advantage is the reduction in computation time compared to deriving a scatter estimate for each short time frame. The duration of the short time frames and long time frames may be constant during a scan or they may depend on the actual movement of the subject during a scan. The scatter estimate may be used for scatter correction of detection data collected in a short time frame or in a long time frame. The detection data may be in list mode, sinogram or image form.

The long and short time frames can also be used in cases where the distribution of the radioactivity changes not only with motion but also with time, e.g. due to biological processes. The cases include dynamic PET. The duration of the long and short time frames will be determined by the change of the distribution, which does not necessarily depend only on the movement of the subject.

Preferably, at least one of the long time frames comprises a plurality of the short time frames. This allows the same detection data to be used in short time frames and in long time frames. In a particular embodiment of the method, detection data is collected in short time frames, and the data in a series of short time frames is added to form the data of a long-time frame.

In a preferred embodiment of the method a short time frame scatter estimate is derived from the long time frame scatter estimate. An estimate of the scatter derived from detection data in a long time frame, a so-called long time frame scatter estimate, can be used to derive a short time frame scatter estimate for short time frames within the long-time frame. The short time frame scatter estimate is preferably used for scatter correction of short time frame detection data or correction of detection data in list mode. In the latter case the short time frame has such a short duration that usually only a single event is recorded (or even none at all) in each short time frame.

In a special embodiment the long time frame scatter estimate is made using scatter modelling on an estimate of an image that is motion corrected for the position of the subject during the corresponding long time frame.

In a specific embodiment of the method according to the invention a plurality of long time frame scatter estimates is added to form a combined scatter estimate, and a scaling factor is determined by fitting the combined scatter estimate to detection data acquired during the plurality of long time frames, the scaling factor being for improving the long time frame scatter estimates. The scaling factor shows a low dependence on the movement of the subject. Hence, the detection data in a plurality of long time frames may be added for the determination of the scaling factor without affecting the quality of the value derived. The added detection data has a higher signal-to-noise ratio, resulting in a more accurate value of the scaling factor.

In a second embodiment of the method according to the invention the first step uses low-spatial-resolution data for deriving the scatter estimate and the second step uses high-spatial-resolution data for the motion correction. The data may relate to detection data and to calculated data, for example in list-mode or in the form of a sinogram or image. Since the distribution of scatter events does not show fast spatial changes, the distribution is less susceptible to movement of the subject. Hence, several calculations on scatter events can be carried out at low spatial resolution, thereby reducing the required computation time. In the second step high spatial-resolution data is used to obtain the required resolution of the image. This second embodiment can be applied advantageously together with the first embodiment, but is also applicable in methods not using the first embodiment.

A further reduction of computation time is achieved when the motion correction and up-scaling from low-spatial resolution to high-spatial resolution is combined in a single operation.

In a third embodiment of the method according to the invention the first step is motion correction of scatter events by repositioning a photon path of a scatter event relative to the detector array in accordance with the movement data or a step equivalent thereto and the second step is motion correction of detection data by repositioning a line of reference appertaining to the detection data relative to the detector array in accordance with the movement data or a step equivalent thereto. The first step of motion correction of the scatter events repositions the photon paths of a scatter event in dependence on the movement. The first step is generally carried out during the computation of the scatter estimate using a model of the scattering process. Since the two photons of a scatter event do not travel along a single line, movement of the subject has a different effect on the scatter sinogram than in the case of two photons of an unscattered event. The second step of motion correction of the detected data corrects for movement of the subject by repositioning the LORs in dependence on the movement, or, equivalently, by repositioning contents of bins in sinograms.

In the first step of the third embodiment the subject is preferably in its reference position and the detector array is positioned according to the movement data. By keeping the subject in its reference position and moving the detector array such that the relative position of the subject and the detector array are the same as during the acquisition of the detection data, computation time of the scatter estimate can be reduced: the photon paths calculated for the subject need not be recalculated for a new position of the subject and only the intersection of the photon paths with the moved detector array must be recalculated.

This third embodiment can be applied advantageously together with the first embodiment, the second embodiment or with a combination of the first and second embodiment. However, it is also applicable in methods not using the first and second embodiment. An example of the latter application is the case when there is no motion during the whole acquisition but the final image needs to be reconstructed in a different position, or when the short and long time frame of the first embodiment are identical.

The above methods for motion correction are applicable to arbitrary motions, including non-rigid motion. The third embodiment is preferably applied to motions where the positions of the body at different instants of time are connected by an affine transformation, including rigid motion of the body.

In some applications the scanning uses gated acquisition, in which gates or time windows for collecting data are triggered by a signal from the subject. For example, triggering by a specific pulse from the heart causes the gates to be synchronous with the cardiac motion. For the purpose of this invention the gates can be equated to the short time frames. The gates resulting from the gated acquisition can be added in the same way as the short time frames in the methods described above.

The object of the invention is also achieved in a method of conducting motion correction for a tomographic scanner including a detector array for detecting radiation from a subject for generating detection data, the method comprising the steps of collecting the detection data and determining movement data representing a time-dependent position of the subject for motion correction, which is characterised in that the method comprises the further steps of motion correcting the detection data resulting in motion-corrected data and scatter correcting the motion-corrected data. The method allows a reduction of the computation time and allows motion correction observing the difference between motion correction of scatter events and unscattered events.

In a special embodiment of the method a scatter estimate is derived for the non-motion corrected subject and subsequently the scatter estimate is motion corrected. This method allows a 'standard' scatter correction, i.e. a correction which does not take motion into account, to be applied. In addition, the same motion correction can be applied to the scatter estimate as used for the motion correction of the detection data, thereby improving the accuracy of the scatter correction. The motion correction is preferably carried out using repositioning of lines of reference.

In another special embodiment a scatter estimate is derived for the subject in its reference position, thereby obtaining the above mentioned reduction in computation time. The scatter estimate is preferably derived for the subject in its reference position and the detector array repositioned in accordance with the movement data. For scatter correction methods that use the motion corrected detection data to obtain an estimate of the distribution of the tracer in the patient, an advantage is that this estimate can immediately be derived directly from the motion corrected detection data and no further motion correction is necessary.

A second aspect of the invention relates to computer software for conducting motion correction for a tomographic scanner including a detector array for detecting radiation from a subject to generate detection data, wherein the software is adapted to carry out any one of the above methods. The second aspect also relates to a data carrier comprising said software.

A third aspect of the invention relates to a tomographic scanner system including a detector array for detecting radiation from a subject to generate detection data, wherein the scanner system is adapted to carry out any one of the above methods.

These and other aspects of the invention will be apparent from and elucidated by way of non-limitative examples with reference to the embodiments described hereinafter and illustrated in the accompanying drawings.

DETAILED DESCRIPTION OF THE INVENTION

Figure 1:
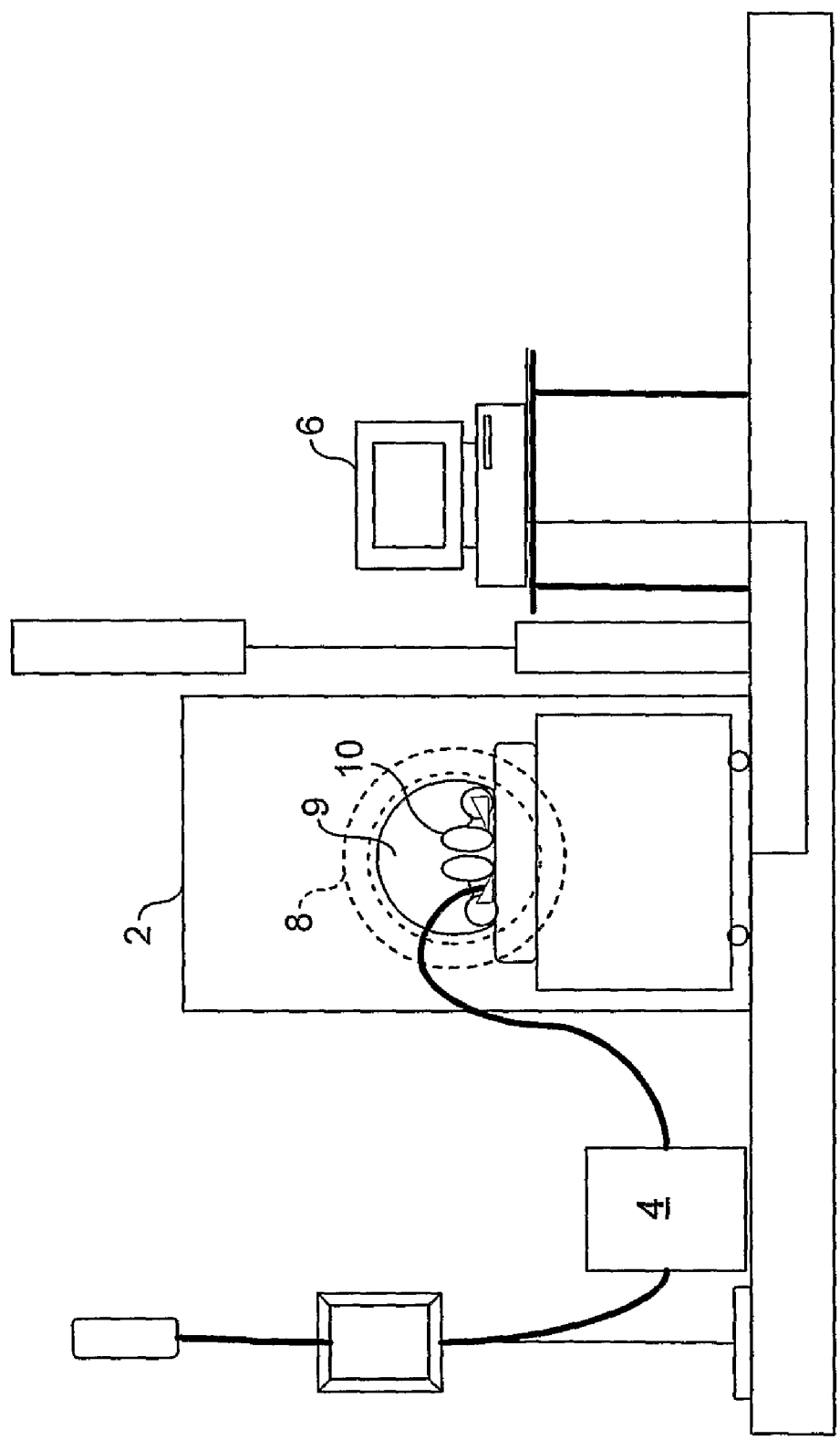
FIG. 1 is a schematic drawing of a PET scanning system.

FIG. 1 shows a tomographic scanner system, arranged in accordance with an embodiment of the invention, which includes a PET scanner 2, a tracer generator module 4 and an operator computer terminal 6. The scanner 2 includes a detector array 8 arranged about a scanning area 9, in which a subject 10 is located during a transmission scan and during an emission scan.

One embodiment of the invention relates to a non-rotating PET scanner, for example, a PET scanner of the ECAT EXACT3D™ type. In this embodiment, the detectors in the detector array 8 are arranged in square detector blocks, each containing multiple detector elements. The detectors blocks are arranged in multiple rings, the rings being arranged adjacent one another along a scanner axis.

Figure 2:
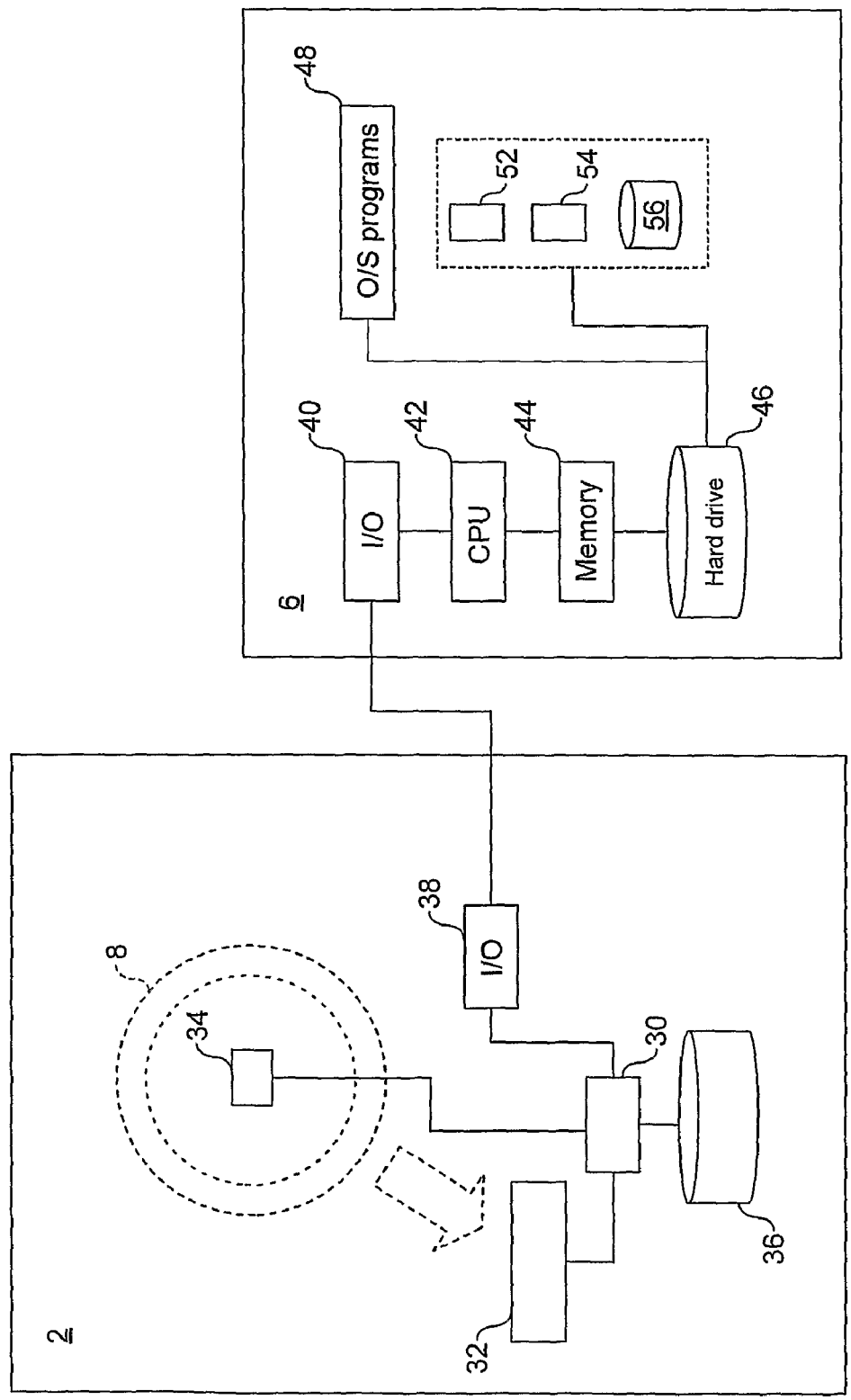
FIG. 2 is schematic drawing of data processing components in a PET scanning system.

As shown in FIG. 2, the PET scanner 2 includes a control unit 30, processing circuitry 32 for detection data received from the detector array, a motion detector 34, a memory 36 for storing the detection data and movement data, and an input/output (I/O) device 38.

The motion detector 34 may be a Polaris™ measurement device, produced by Northern Digital Inc. of Waterloo, Canada, which determines movement data by measuring the motion of a plate with four reflectors using infrared radiation. This plate can be attached to a neoprene cap closely fitting the head of the subject, so as to track movement of the head. The motion detector produces movement data indicating translational motion along three orthogonal axes and rotational motion about three orthogonal axes.

Movement data can also be determined from the collected photon data. Short time frame images of the subject can be reconstructed without attenuation or scatter correction. These images are put in register with the image of a transmission scan. The movement required for registering the images provides the required movement data of the subject.

The computer terminal 6 includes a central processing unit (CPU) 42, a memory 44, a hard disc drive 46 and an I/O device 40, which facilitates interconnection of the computer 6 with the PET scanner 2.

Operating system programs 48 are stored on the hard disc drive 46, and control, in a known manner, low level operation of the computer terminal 6. Program files and data 50 are also stored on the hard disc drive 46, and control, in a known manner, outputs to an operator via associated devices. The associated devices include a display, a pointing device and keyboard (not shown), which receive input from and output information to the operator via further I/O devices (not shown). Included in the program files 50 stored on the hard disc drive 46 are motion correction software 52 and image reconstruction software 54. A database 56 is used to store the detection data and movement data transferred from the PET scanner 2.

In acquisition mode, the processing circuitry 32 processes all events detected in the detector array 8 and, by using a coincidence timing window, detects coincidences between the events which, are recorded as coincidence counts. These coincidence counts are then output in list-mode to data store 36, where it is stored as a list file for subsequent processing. In parallel with the data acquisition by the radiation detectors, movement data is collected preferably at regular, sub-second intervals (e.g. 10 Hz) from motion detector 34 and also sent to data store 36 for subsequent processing.

Figures 3, 4:
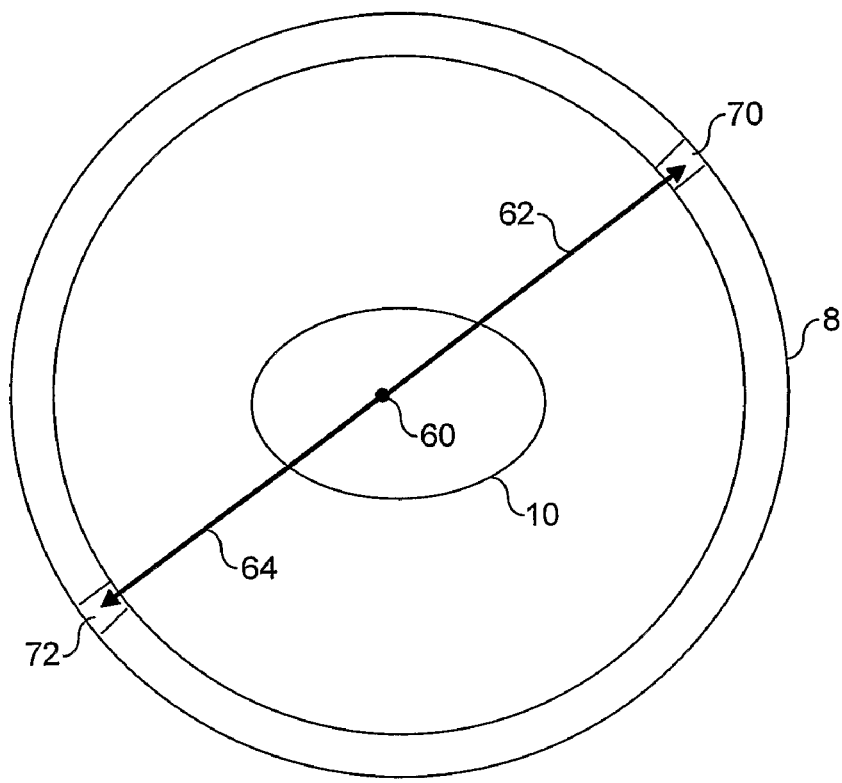
FIG. 3 shows a cross section of a detector array and a subject being scanned.
FIG. 4 shows a representation of a list mode file.

FIG. 3 illustrates features of operation of the PET scanner during an emission scan. During an emission scan, the subject 10 is placed in the scanning area and contains the tracer generated by the tracer generator module 4. FIG. 3 shows a positron emission event being registered in the detector array 8. The positron 60 annihilates and generates a first photon 62 travelling in one direction and a second photon 64 travelling in the opposite direction. The first photon is detected by a detector element 70 on one side of the detector array 8, and the second photon 64 is detected in a different detector element 72 on the other side of the detector array 8. As described above, the processing circuitry 32 registers the two detection events as a coincidence along the LOR defined by the position of the two detector elements 70 and 72.

FIG. 4 shows a representation of a list file in which the detection data are stored in the memory 36. The file comprises three columns, one for entering the time t of an event and two for entering the detector elements D1 and D2 in which the event was detected. For each coincidence a record is entered in the file, the record comprising the time and two entries identifying the detector elements in which the event was detected. Each set of values D1 and D2 defines a line of response (LOR) connecting detectors D1 and D2.

Figure 5A:
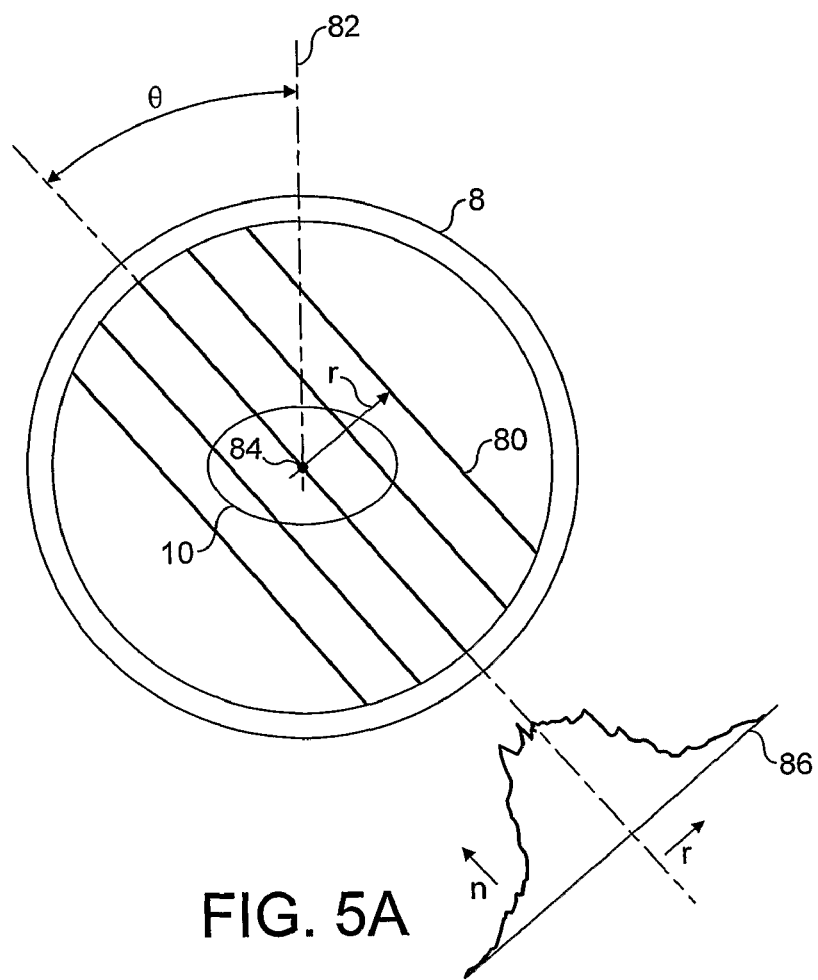
FIG. 5A shows a cross section of the detector array and parameters used in forming a sinogram.
Figure 5B:
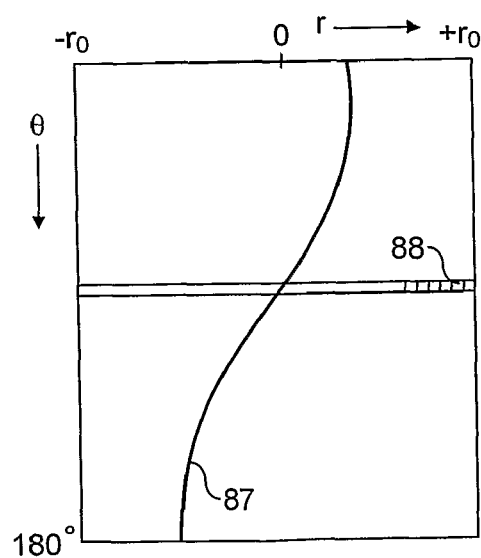
FIG. 5B shows a sinogram.

In some methods of processing detection data the list file is transformed to a sinogram presentation. FIG. 5 shows the parameters used in forming (2-dimensional) sinograms. The transformation starts assigning an angle $\theta$ and a distance r to each record in the list file. The angle $\theta$ is the angle between the LOR of the record and a reference axis 82. The distance r is the shortest distance between the LOR and the centre 84 of the detector array 8. The Figure shows a series of LORs having the same value of the angle $\theta$. Each LORs is stored as a count in a one-dimensional array 86, called a sinogram row. The row comprises a number of bins 88 commensurate with the spatial resolution of the scanner. Each row has assigned to it a specific value of the angle $\theta$ and each bin in a row has assigned to it a specific value of the distance r, the distance running from $-r_0$ to $+r_0$, $r_0$ being the distance r pertaining to the first and last bin of the row. The count in a bin is increased by one for each LOR having the values of $\theta$ and r pertaining to the bin. The sinogram row is a projection of the radioisotope distribution in a slice of the subject in direction $\theta$. The sinogram rows for all angles $\theta$ between 0° and 180° are combined to a sinogram as shown in FIG. 5B. The sinogram derives its name from the fact that an off-centre point source in the subject shows up as a sinusoidal line, for example line 87, in the sinogram. There are several methods for reconstructing an image of the subject from the detection data. A method based on the point-spread function starts with a test scan using a point source in the scanning area. The detection data of the test scan, in list mode or sinogram mode, form the point-spread function of the scanner. Subsequently, a subject is scanned. The detection data of the subject are deconvolved with the point-spread function, resulting in an image of the subject. Another analytic method uses an inverse Fourier transform. The inverse Fourier transform of a two-dimensional sinogram results in a two-dimensional image of the subject. In iterative methods the quality of the image is improved in a series of repeated steps. Examples of these methods will be discussed below. It should be noted that in 3D PET scanning the two rings where the protons have been detected correspond to two extra coordinates. The text below uses the word 'sinogram' for the whole data-set, in fact a double set of sinograms.

The word 'data' includes among others detection data from the photon detector array, and data of the subject relating to position, movement, emission distribution and attenuation.

Movement of the subject during the scan causes blurring of the image. Therefore, detection data is collected during a short time frame and this data is motion-corrected and, in some embodiments, scatter corrected before being added to data of another short time frame. The duration of a short time frame depends on the motion of the subject and may have a flexible duration. It is in general determined by the requirement that the movement of the subject in a short time frame may not affect substantially the resolution of the final image of the subject. An example of an acceptable reduction of the resolution is 10%. In a particular embodiment a short time frame ends when, from the start of the short time frame, the movement of any point of the subject within the field of view reaches a first predetermined value, e.g. one mm. The predetermined value is preferably equal to one third of the intrinsic FWHM of the point spread function of the scanner, preferably as measured according to the NEMA standard. A typical duration is a few seconds.

Figure 6:
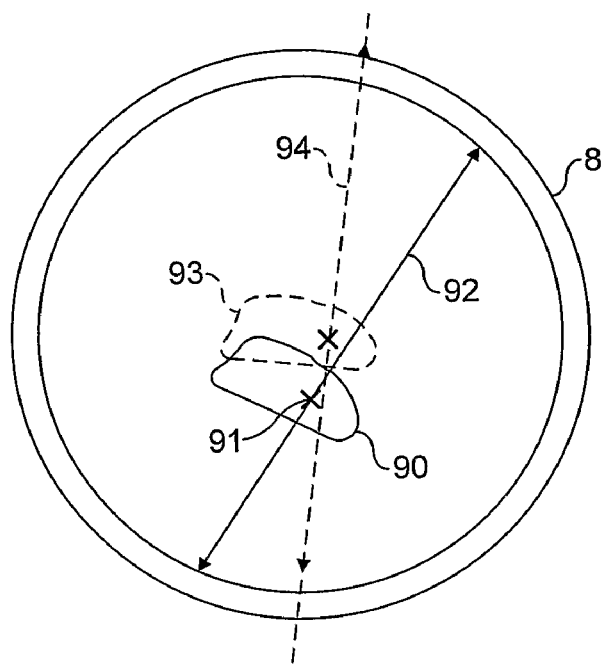
FIG. 6 shows motion correction of an unscattered event.

There are several methods to correct data for the movement of the subject. The method of Y. Picard and C. J. Thompson has been disclosed above. Another method applies the motion correction to data in the list mode file, as disclosed in inter alia M. E. Daube-Witherspoon et al. in J. Nucl. Med. (1990) 31, 816. The LOR as detected is transformed to the LOR that would have been detected had the subject not moved. The principle of the correction is shown in FIG. 6. The subject 90, indicated by the drawn line, is the subject in the position when the emission of the two photons occurs. The point of emission is indicated by a cross 91. The path of the two photons, which for an unscattered event is the LOR, is shown as a drawn line 92, the arrows on which are pointing to the detector elements of the detector array 8 that detect the coincidence. Reference numeral 93 is the subject in its reference position, indicated by the dashed line. The reference position may be the position of the subject at the start of the scan. Using the movement data of the subject, LOR 92 is transformed to LOR 94 that would have been detected if the subject had not moved. The intersections of LOR 94 with the detector array 8 give the detector elements that would have detected the coincidence if the subject had not moved. The motion correction of the list file consists in replacing in the record the two detector elements which actually detected the coincidence by the detector elements that would have detected the coincidence. The actual calculation of the motion correction need not compute the intersection of the motion-corrected LOR with the detector array. The motion-corrected LOR can be used to calculate directly a position in the motion-corrected sinogram. The method of motion correction of unscattered events using only LORs is equivalent to the methods of repositioning counts in sinograms or repositioning photon paths of an unscattered event.

For the purpose of forming an estimate of the scatter present in the detection data, the detection data is collected according to an embodiment of the invention during a long time frame. The duration of a long time frame is longer than the duration of a short time frame. The duration of a long time frame depends on the notion of the subject and may have a flexible duration. It is in general determined by the requirement that the movement of the subject in a long time frame may not affect substantially the distribution of scatter events. In a particular embodiment the long time frame ends when the motion within the long time frame reaches a second predetermined value, e.g. one cm. The second predetermined value depends among others on the radius of the detector array and is preferably equal to three times the intrinsic FWHM of the point spread function of a present-day scanner. A typical duration is a few minutes.

There are several methods to correct the data for scattering, see e.g. H. Zaidi and K. F. Koral in Eur. J. Nucl. Med. Vol. 31, No. 5, 761-782, 2004. In a first scatter-correction method as disclosed in D. L. Bailey and S. R. Meikle in Phys. Med. Biol. 39(3) 411-424, 1994 an emitting point source is placed in a scattering medium that is representative for the type of study that will be performed and a test scan is made. The sinogram of the point source has a high spatial resolution component and a low spatial resolution background, the latter being due to scatter. This background represents the scatter response function of the scanner. The sinograms of the subject are deconvolved with the scatter point spread function, resulting in scatter-corrected images. A similar method can be used on reconstructed images, as disclosed in M. J. Lercher and K Wienhard in IEEE Trans. Med. Imag. MI-13(4), 639-657, 1994.

In a second scatter-correction method the scatter estimate is based on a physical model of the scattering process. The model may describe the scattering process by a Monte-Carlo process, as disclosed e.g. by C. H. Holdsworth et al. in IEEE Trans. Nuclear Sci. 49 (1) 83-89, 2002, or by a numerical calculation of an integral representing the scatter probability as disclosed e.g. by J. M. Ollinger, Phys. Med. Biol. 41 153-176, 1996. The method starts with an image derived from a reconstruction without motion correction and without scatter correction or with scatter correction based on for example the scatter point spread function. The scatter sinogram of the image is calculated using the physical model and an estimate of the attenuation in the subject. This scatter sinogram is subtracted from the measured sinogram, resulting in a scatter-corrected sinogram. A new image is reconstructed from the scatter-corrected sinogram. The new image can now be used as a second step in an iteration process to calculate again a scatter sinogram. The iteration process results in the scatter-corrected image.

In some cases the physical model of the scattering process does not provide a sufficiently accurate quantitative estimate of the scatter, e.g. because of scatter from parts of the body outside the field of view of the scatter. The accuracy of the estimate can be improved by scaling the estimate. Scaling is carried out by multiplying the counts in the scatter estimate by one or more scaling factors. A fit of the scatter estimate to the detection data provides a value of the scaling factor. In the so-called tail fitting method the fit is performed only on those LORs in a list or sinogram that do not intercept the subject and which therefore relate to scatter events.

Figure 7:
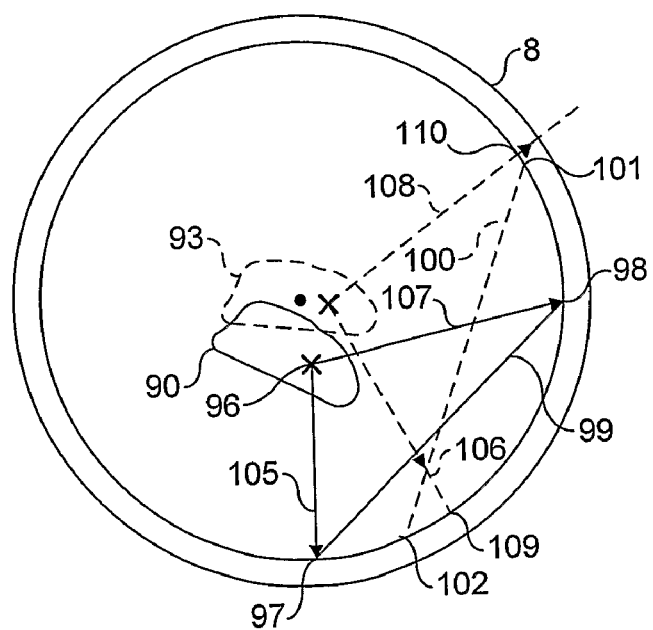
FIG. 7 shows motion correction of a scatter event.

When motion correction is necessary, the method explained with reference to FIG. 6 should preferably not be applied to scatter events without precautions. The reason is explained with reference to FIG. 7. The Figure shows an annihilation event where one of the photons is scattered at a point 96 within the subject, causing the two photons to travel in substantially different directions. The photons are detected by detector elements 97 and 98. If the software treats the scatter event as an unscattered event, it will take the drawn line 99 as the LOR of the event. Motion correction will reposition LOR 99 to the dashed line 100 as the motion-corrected LOR and assign detector elements 101 and 102 as the elements where the event would have been detected had the subject not moved. However, the assignment is not correct. The correct detector elements can only be found by repositioning photon path 105 to 106 and photon path 107 to 108 using the transformation given by the movement data and subsequently determining the intersection of the repositioned paths with the detector array 8. The correct detector elements are indicated by the reference numerals 109 and 110. Hence, motion correction of scatter events should, according to the invention, preferably use repositioning of photon paths and not repositioning of LORs as used for unscattered events.

The image may be degraded by the presence of random events. An example of a random event is an accidental coincidence caused by two annihilations. A random-correction method forms an estimate of the random event rate by measuring the rate at which two photons are detected in two 10 ns wide windows at a 1 ms delay. Such a delayed detection cannot be caused by photons resulting from a single annihilation. The measured rate can be converted to a zero millisecond delay of the windows, which is the desired random event rate to be used for the correction.

The following description discloses different methods A to G for combined motion correction and scatter correction. The methods A to D derive a non-motion corrected scatter estimate, use the estimate to scatter-correct non-motion corrected detection data, and finally motion correct the scatter corrected detection data. In method A the detection date is processed as reconstructed images, in method B as sinograms. Method C relates to an optimisation of method B in case scaling is used to improve the scatter estimate. In method D the detection data is processed in list mode. The reconstruction of the image from the detection data may be carried out using an analytic method or an iterative method. The following paragraphs give specific embodiments of the methods.

The first combined correction method A applies scatter correction to short time frame images of a subject by performing the steps A1 to A7:

A1. In the first step non-scatter-corrected images for short time frames are reconstructed from the detection data without motion correction.

A2. In the second step these short time frame images are combined into long time frame images by adding them.

A3. In the third step scatter estimates are computed on the long time frame images. The estimates may be computed using one of several different methods, such as the first scatter-correction method described above. The scatter-corrected images provided by these methods are subtracted from the images with scatter, resulting in images containing a scatter estimate for the long time frames. This scatter estimate depends on the movement of the subject.

A4. In the fourth step scatter estimates for the short time frames are derived from the scatter estimate for the long time frames. A first method assigns the scatter estimate of a long time frame to each short time frame falling within the long time frame. A second, more accurate method determines the scatter estimate for a short time frame by interpolating between neighbouring scatter estimates for long time frames. The interpolation weights may be made dependent on the change of the distribution of the scatter estimate, e.g. due to a large motion between long time frames. Both methods preferably correct the scatter estimates for the difference in duration between long and short time frames and for the decay of the radioactive tracer.

A5. In the fifth step the short time frame images are corrected for scatter by subtracting the appropriate short time frame scatter estimates from the short time frame images.

A6. In the sixth step the scatter-corrected short time frame images are motion corrected.

A7. In the seventh step the motion corrected short time frame images are added to obtain one or more final images.

Since the short time frame images in step A6 have been corrected for scatter, most of the data in the images relate to unscattered events and, consequently, the images can be motion corrected using any known method without the need to pay special attention to the effect of motion correction on scatter events. In dynamic PET scanning step A6 is optional and step A7 is usually omitted. Steps A6 and A7 are usually included in static PET scanning.

In the similar, second combined correction method B the scatter correction is applied to sinograms, not to images as in the previous method, and uses the steps B1 to B8:

B1. Detection data is collected in short time frame sinograms. These sinograms may be corrected for random events and normalised. The above random-correction method may be used for the correction for random events. Normalisation includes correction for different efficiencies of the detectors. Correction factors for the normalization are usually obtained in a test run of the scanner using a well-defined radioactive source.

B2. In the second step these short time frame sinograms are combined into long time frame sinograms by adding them. The long time frame sinograms have a higher signal-to-noise ratio than the short time frame sinograms.

B3. In the third step a scatter estimate is determined for each long time frame sinogram. The estimate is in the form of a scatter sinogram and is derived as in the first or second scatter-correction method described above.

B4. In the fourth step scatter estimates for the short time frames are derived from the scatter estimate for the long time frames as set out in step A4 of the previous method.

B5. In the fifth step the short time frame sinograms are corrected for scatter by subtracting the appropriate short time frame scatter estimates from the short time frame sinograms.

B6. In the sixth step a scatter-corrected short time frame image is reconstructed from each scatter-corrected short time frame sinogram.

B7. In the seventh step the scatter-corrected short time frame images are motion corrected.

B8. In the eighth step the motion corrected short time frame images are added to obtain one or more final images.

In dynamic PET scanning step B7 is optional and step B8 is usually omitted. Steps B7 and B8 are usually included in static PET scanning.

The third combined correction method C is particularly suitable for model-based scatter estimates, using the steps C1-C7:

C1. Determine an initial estimate of the image of the subject. The estimate can be obtained in several ways. One way is to add several short time frame sinograms and reconstruct the image from them without motion correction. The initial image may be scatter-corrected, for example using one of the methods for scatter correction described in step A3 above.

C2. For each short time frame the initial image is placed in the position indicated by the movement data appertaining to this short time frame. The physical model for the emission and attenuation is applied to this repositioned initial image and used to calculate the distribution of the scatter events in the form of a scatter sinogram. At this stage the calculated distribution is not yet scaled to the measured scatter distribution.

C3. In the third step the calculated short time frame scatter sinograms are added to form a calculated long time frame scatter sinogram. Similarly, the measured short time frame sinograms are added to form a measured long time frame sinogram.

C4. The calculated long time frame scatter sinogram is fitted to the measured long time frame sinogram by scaling the magnitude of the calculated scatter distribution.

C5. In the fifth step a scaling factor is derived for each short time frame from the scaling factors calculated for the long time frames in the previous step. A first method assigns the scaling factor of a long time frame to each short time frame falling within the long time frame. A second method determines the scaling factor for a short time frame by interpolating between neighbouring scaling factors for long time frames. In each short time frame the calculated short time frame scatter sinogram is scaled using the scaling factor for this time frame. Subsequently, the scatter-corrected short time frame sinogram is obtained by subtracting the scaled scatter sinogram for the short time frame from the measured short time frame sinogram.

C6. In the sixth step an image is reconstructed from the scatter-corrected short time frame sinogram. The image is subsequently motion corrected.

C7. The short time frame images are added to form long time frame images.

If desired the above steps may be carried out in an iterative process, wherein the long time frame image obtained in step C7 is used as input in step C2.

The third combined correction method C relies on the fact that the scaling factors have a very low dependence on movement of the subject. Hence, the duration of the long time frames for determining the scaling factors in method C may be longer than the duration of the long time frames in methods A and B. The long time frame in method C may have a duration of for example five minutes.

The computing time for the above procedure can be reduced by using the long time frame in step C2 instead of the short time frames. In step C3 the long time frame scatter sinograms are added to form a calculated and a measured scatter sinogram for a series of long time frames, on which the fitting of step C4 is performed. The output in step C5 will then be the long time frame scatter estimates, and one proceeds as in step B4 of the second method. The series of long time frames may have the duration of the data acquisition period. In another embodiment of the method especially for small movements the long time frame can be made equal to the total acquisition period of the scan. However, the scatter estimates must be determined on long time frames that are restricted by a maximum movement of 1 cm.

The fourth combined correction method D corrects detection data in list mode. The method derives a long time frame scatter estimate from non-motion-corrected data; the scatter correction, motion correction and the operation of reconstructing the image are carried out on the list mode data. The two correction steps and the reconstruction are preferably carried out in one operation. The time frames from one event to the next event in the list are regarded as short time frames. The method comprises the following steps D1 to D4:

D1. In the first step the detection data in list mode are binned into long time frame sinograms. The corrections given under step B1 may be applied to the sinograms.
D2. In the second step long time frame scatter sinograms are determined from the long time frame sinograms, using for example the first or second scatter-correction method described above. The long time frame scatter sinograms are preferably at a lower spatial resolution than sinograms used for reconstructing high-resolution images.
D3. In the third step the scatter estimate for a particular short time frame (or event of the list mode data) is computed by interpolation in the long time frame scatter sinograms.
D4. The scatter correction is made by introducing a term dependent on the scatter estimate in the algorithm for reconstructing the image from the list mode data. The motion correction is carried out by modifying the probability of detection to take the motion into account.

An example of an iterative reconstruction algorithm for use in step D4 is the MLEM algorithm as disclosed in Parra and Barrett, IEEE Trans. in Med. Imaging, Vol. 17, No. 2, pp. 228-235, 1998, modified by taking time-dependence of the probabilities into account. The formula for deriving the $k+1^{th}$ value of the average emission distribution over the time frame $[0,T]$ from its $k^{th}$ value is given by:

$$\lambda_v^{(k+1)} = \frac{\lambda_v^{(k)}}{P_v} \sum_n P_{p_n v}^{\prime n} \frac{1}{\sum_{v'} P_{p_n v'}^{\prime n} \lambda_{v'}^{(k)} + s(p_n, t_n) + r(p_n, t_n)},$$

where:

$\lambda_v^{(k)}$ is the estimate at the k-th iteration of the radioactivity in voxel v.

n indexes the list mode events.

$t_n$, $p_n$ are the list mode time frame and detector pair of event n. The list mode time frames are the short time frames of the list mode data within the interval $[0,T]$.

$P_{pv}^t$ is the probability of detection during list mode time frame t by detector pair p of an unscattered photon pair originating from an annihilation in voxel v. The time dependence may take (possibly non-rigid) motion into account. For example, the voxel could be moved from its reference position to its average position during frame $t_n$, and $P_{pv}^t$ can then be computed on the probability of detection of an event in this moved voxel by detector pair $p_n$.

$P_v$ is the total probability of detection during time frame $[0,T]$ by any detector pair of an unscattered photon pair originating from an annihilation in voxel v.

s(p,t) is the probability of detection during list mode time frame t by detector pair p of a scattered event and may be obtained by multiplying the detector efficiencies with the interpolation from the sinograms produced in step D2 above.

r(p,t) is the probability of detection during list mode time frame t by detector pair p of an accidental coincidence.

The scatter estimate of method D may be incorporated in a similar way in a method for estimating the dynamic variation of the emission distribution as in Asma et al, Proceedings of the IEEE Medical Imaging Conference 2004.

The following combined correction methods E to G derive a motion corrected scatter estimate, motion correct the detection data and use the scatter estimate to scatter correct the motion corrected detection data. Method E derives the scatter estimate for the non-motion corrected subject and subsequently motion corrects the scatter estimate. In method F the scatter estimate is derived for the motion corrected subject, i.e. the subject in its reference position. Method G is similar to method F but is based on detection data in the form of images instead of sinograms. The reconstruction of the image from the detection data may be carried out using an analytic method or an iterative method. The following paragraphs give specific embodiments of the methods.

In the fifth combined correction method E the detection data are first motion corrected and then scatter corrected. The scatter estimate is derived from non-motion corrected data; the scatter estimate is motion corrected before being used for the scatter correction of the motion corrected detection data. The method comprises the following steps E1 to E6.

E1. In the first step detection data is collected in short time frame sinograms and may be corrected as stated in step B1.
E2. In the second step these short time frame sinograms are combined into one or more long time frame sinograms by adding them.
E3. In the third step a scatter estimate is determined for each long time frame sinogram. The estimate is in the form of a scatter sinogram and may be derived as in the first or second scatter-correction method described above.
E4. In the fourth step the long time frame scatter sinograms of step E3 are corrected for motion to form one or more motion corrected long time frame scatter sinograms.
E5. In the fifth step the short time frame sinograms of step E1 are corrected for motion of the subject and are subsequently added to form one or more long time frame motion-corrected sinograms, relating to the same time frames as the scatter sinograms of step E4.
E6. In the sixth step scatter-corrected long timeframe sinograms are obtained by subtracting the long time frame scatter sinograms from the corresponding long time frame sinograms. The one or more final images are reconstructed from the scatter-corrected long timeframe sinograms. The image or images may also be reconstructed from the long time frame scatter sinograms and the long time frame sinograms using an iterative method.

The motion correction in step E5 applies the motion correction algorithm for the non-scattered events, for example LOR repositioning, also for the scatter events. As has been explained with reference to FIGS. 6 and 7, the algorithm will not provide the proper motion correction for the scatter events. To compensate for the inappropriate motion correction of the detected scatter events, step E4 uses the same inappropriate algorithm as used in step E5 to correct the scatter estimate for motion. The fact that the final compensation is a proper compensation is due to the fact that the scattered and unscattered distributions are linearly superposed.

The long time frame motion corrected scatter sinograms in step E4 may be added to form a sinogram having the duration of the total acquisition period of the scan. The long time frame motion-corrected sinogram in step E5 may then also have the duration of the total data acquisition period and step E6 uses only long time frames having the duration of the total acquisition period.

The described embodiment of method E is based on sinograms. The method may similarly be applied to data in list mode and to data in the form of images.

The sixth combined correction method F is similar to method E. The detection data are first motion corrected and then scatter corrected. The method comprises the following steps F1 to F5:

F1. In the first step detection data is collected in short time frame sinograms and may be corrected as stated in step B1.
F2. In the second step the short time frame sinograms are motion corrected using an algorithm for unscattered events, for example LOR repositioning.
F3. In the third step the motion-corrected short time frame sinograms are combined into one or more long time frame sinograms by adding them.
F4. In the fourth step a scatter estimate is derived starting from an estimate of the image in the non-motion corrected position. The paths of the scattered photons are determined using a physical model of the scattering process, e.g. a Monte-Carlo process or scattering probabilities. The LOR of each scatter event is determined by the intersection of the photon paths and the detector array. Each LOR is motion corrected as if the event were an unscattered event. The motion corrected LORs are binned in one or more long time frame scatter sinograms. The scatter sinograms are scaled by fitting them to the long time frame sinograms of step F3. If necessary, the scatter sinograms can be used to correct the long time frame sinograms of step F3 for scatter, reconstruct an improved image and start again the calculation of the photon paths.
F5. In the fifth step scatter-corrected long timeframe sinograms are obtained by subtracting the long time frame scatter sinograms from the corresponding long time frame sinograms. The one or more final images are reconstructed from the scatter-corrected long timeframe sinograms. The image or images may also be reconstructed from the long time frame scatter sinograms and the long time frame sinograms using an iterative method.

In the calculations of step F4 the changing position of the subject is usually taken into account by recalculating the LORs and/or photon paths for each new position of the subject and determining the detector elements that detect the photons. The calculations may be accelerated by keeping the subject and, hence, the image in the reference position and moving the detector array in opposite direction to the movement of the subject, thereby maintaining the relative position of the subject within the detector array. When the photon paths for the scatter events have been calculated for the first frame, they can be used unaltered in all subsequent frames. For the determination of the LORs in each subsequent frame the only calculation to be made is the intersection of the photon paths with the moved detector array. This acceleration may be applied to any method that calculates scatter estimates in moved subjects.

Method F has the advantage that the detection data can be processed in one pass to obtain motion-corrected data, which is used as input for both the derivation of the scatter estimate and the reconstruction of the image.

The described embodiment of method F is based on sinograms. The method may similarly be applied to data in list mode and to data in the form of images. In the list mode the short-time frame sinograms in steps F1-F3 are replaced by list mode events and in step F3 the short-time frame sinograms are not added but the events are binned into the long time frame sinogram.

The seventh combined correction method G is similar to method F. The method includes the following steps G1 to G6:

G1. In the first step the detection data is binned in short time frame sinograms and may be corrected as stated in step B1.
G2. In the second step a short time frame image is reconstructed from each short time frame sinogram and the image is motion corrected using a method designed for unscattered events.
G3. In the third step the motion corrected images are added to form one or more motion corrected long time frame images.
G4. In the fourth step the short time frame sinograms of the first step are added to form long time frame sinograms without motion correction, from which one or more long time frame images are reconstructed. A long time frame scatter estimate is derived from the images.
G5. In the fifth step the long time frame scatter estimate is motion corrected using the same algorithm used for the motion correction in step G2 or an equivalent method. The motion corrected long time frame scatter estimates may be added for the total data acquisition period.
G6. In the sixth step the one or more motion corrected long time frame images are scatter corrected using the one or more long time frame scatter estimates.

The above combined correction methods use different methods for deriving a scatter estimate, motion correction and image reconstruction, which are applied to list mode data, sinograms or images. The different methods and the data they are applied to are not restricted to the combinations shown in the described correction methods but may be combined in any feasible combination.

The computing time can be reduced further by using low-spatial resolution operations in the calculations for the scatter correction. The various possibilities of using low-spatial resolution calculations will now be shown in three examples applicable to methods E, F and G.

In the first example the motion correction is applied to scatter data that is up-sampled to high-spatial resolution. The calculation includes the following steps:

$$M_{n \times n}{}^{t} U_{n \times k} S_{k \times m}(s^{r})$$

where $s^r$ is a high-resolution sinogram of size m. $S_{k \times m}$ is a matrix that derives a low-resolution scatter estimation sinogram of size k from the high-resolution sinogram $s^r$, where k<m. $U_{n \times k}$ is an up-sampling matrix, converting a low-spatial resolution sinogram of size k to a high-resolution sinogram of size n, where n>k. The up-sampling may use interpolation. The motion correction is carried by out the time-dependent matrix $M_{n \times n}{}^{t}$, acting on the up-sampled sinogram of size n and providing as output a motion-corrected scatter estimation sinogram of size n, with n≦m.

The second example applies motion correction before up-sampling and requires fewer interpolations than the first example:

$$U_{n \times k} M_{k \times k}{}^{t} S_{k \times m}(s^{r})$$

The third example combines the motion correction and the up-sampling in one interpolation step. For a given output sinogram position, it determines the position in the scatter estimation sinogram and interpolates between neighbouring values:

$$M_{n \times k}{}^t S_{k \times m}(s^t)$$

The scatter estimation sinograms of a plurality of long time frames may be added. A computational advantage can be achieved if the addition is made before up-sampling:

$$U_{n \times k} \sum_t M^t_{k \times k} S_{k \times m}(s^t)$$

The repositioning of LORs may cause photons to escape the detector array. This can be corrected for by introducing scale factors as set out in the earlier European patent application no. 0324374.8. These scale factors are preferably applied before scatter estimation. Alternatively, the scatter estimate may be multiplied with the scale factors. If the scale factors are below the threshold defined in the earlier application, the appropriate sinogram bins should be excluded in fitting routines. If such exclusion is not possible, the entire sinogram can be removed from the data used to compute the scatter estimate.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of conducting motion correction for a tomographic scanner including a detector array for detecting radiation from a subject to generate detection data, wherein the method comprises:
   collecting the detection data during a data acquisition period and determining movement data representing a time-dependent position of the subject during the data acquisition period,
   characterised in that the method comprises a first step of deriving a scatter estimate for use in the reconstruction of an image of the subject, the first step having a first dependence on the movement of the subject, and a second step of deriving the image of the subject from the detection data, the second step having a different, second dependence on the movement of the subject;
   wherein the data acquisition period comprises long time frames and short time frames, the long time frames and short time frames having different durations determined by the movement, and the first step includes deriving a long time frame scatter estimate and the second step includes motion correction of the detection data collected in a short time frame.

2. A method according to claim 1, wherein at least one of the long time frames comprises a plurality of the short time frames.

3. A method according to claim 1, wherein a short time frame scatter estimate is derived from the long time frame scatter estimate.

4. A method according to claim 3, wherein the short time frame scatter estimate is used for scatter correction of short time frame detection data.

5. A method according to claim 4, wherein the short time frame scatter estimate is used for scatter correction of detection data in list mode.

6. A method according to claim 1, wherein the long time frame scatter estimate is made using scatter modelling on an estimate of an image that is motion corrected for the position of the subject during the corresponding long time frame.

7. A method according to claim 1, wherein a plurality of long time frame scatter estimates is added to form a combined scatter estimate, and a scaling factor is determined by fitting the combined scatter estimate to detection data acquired during the plurality of long time frames, the scaling factor being for improving the long time frame scatter estimates.

8. A method according to claim 6, wherein the estimate of the image is improved in an iterative loop.

9. A method according to claim 1, wherein the short time frames are gates used in gated acquisition of the detection data.

10. A method according to claim 1, wherein the first step uses low-spatial-resolution data for deriving the scatter estimate and the second step uses high-spatial-resolution data for the motion correction.

11. A method according to claim 10, wherein the motion correction and up-scaling from low-spatial resolution to high-spatial resolution is combined in a single operation.

12. A method according to claim 1, wherein:
   the first step is motion correction of scatter events by repositioning a photon path of a scatter event relative to the detector array in accordance with the movement data or a step equivalent thereto and
   the second step is motion correction of detection data by repositioning a line of reference appertaining to the detection data relative to the detector array in accordance with the movement data or a step equivalent thereto.

13. A method according to claim 12, wherein, during calculations, the subject is in its reference position and the detector array is positioned according to the movement data.

14. A method of conducting motion correction for a tomographic scanner including a detector array for detecting radiation from a subject for generating detection data, the method comprising the steps of:
   collecting the detection data and determining movement data representing a time-dependent position of the subject for motion correction,
   characterised in that the method comprises the further steps of:
      deriving a scatter estimate for the non-motion corrected subject and subsequently motion correcting the scatter estimate;
      motion correcting the detection data resulting in motion-corrected data; and
      scatter correcting the motion-corrected data using the motion-corrected scatter estimate.

15. A method according to claim 14, wherein the scatter estimate is motion corrected using repositioning of lines of reference.

16. A method according to claim 14, wherein a scatter estimate is derived for the subject in its reference position.

17. A method according to claim 16, wherein the scatter estimate is derived for the subject in its reference position and the detector array repositioned in accordance with the movement data.

18. A method according to claim 14, wherein the detection data is processed in list mode, as sinograms or as reconstructed images.

19. A method according to claim 14, including the step of reconstructing the image from the detection data using an analytic method or an iterative method.

20. Computer software for conducting motion correction for a tomographic scanner including a detector array for detecting radiation from a subject to generate detection data, wherein the software is adapted to carry out the method according to claim 1.

21. A data carrier comprising computer software according to claim 20.

22. A tomographic scanner system including a detector array for detecting radiation from a subject to generate detection data, wherein the scanner system is adapted to carry out the method according to claim 1.

* * * * *